April 27, 1937.  T. H. RISK  2,078,277
DIFFERENTIAL PRESSURE GAUGE
Filed Nov. 27, 1934  2 Sheets-Sheet 1
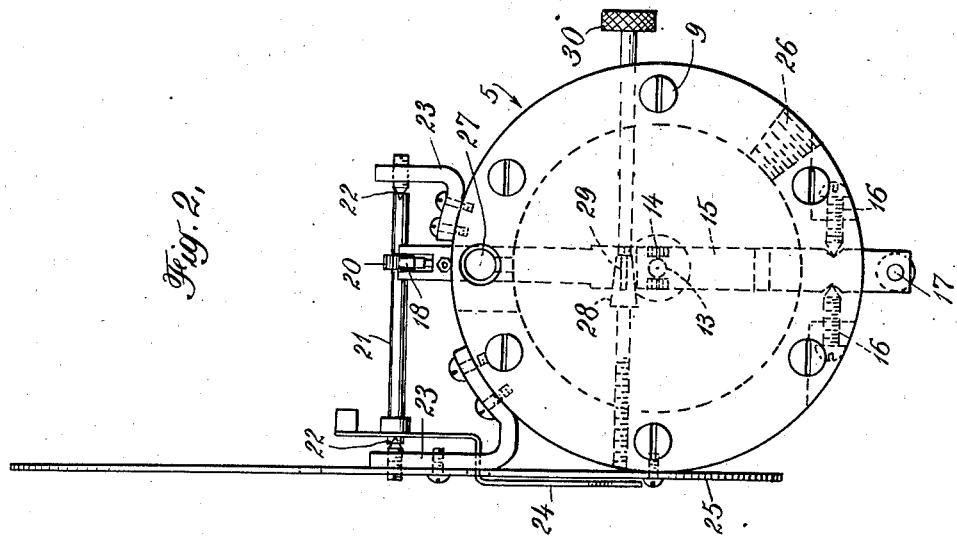
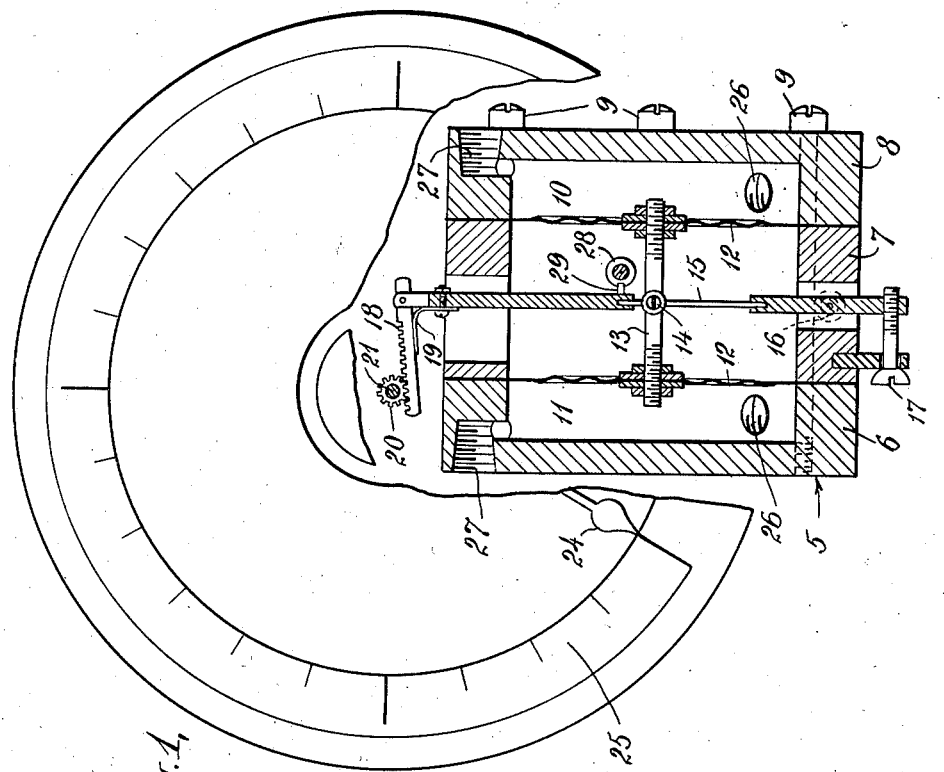
INVENTOR
Thomas H. Risk
BY
ATTORNEY April 27, 1937.  T. H. RISK  2,078,277
DIFFERENTIAL PRESSURE GAUGE
Filed Nov. 27, 1934  2 Sheets-Sheet 2
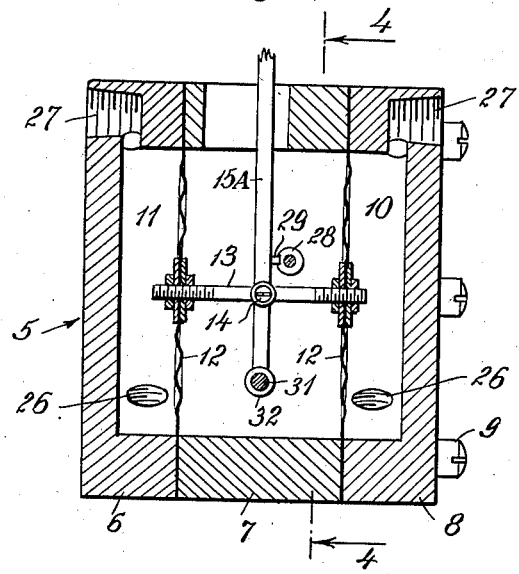
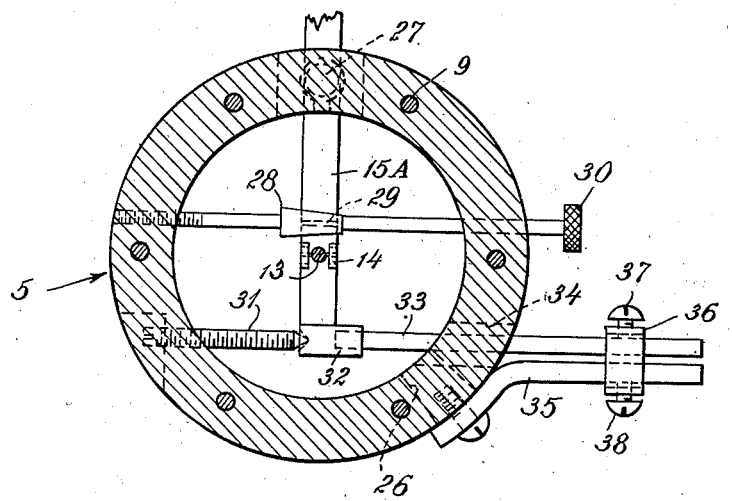
INVENTOR
Thomas H. Risk
BY
ATTORNEY Patented Apr. 27, 1937

2,078,277

UNITED STATES PATENT OFFICE 2,078,277

DIFFERENTIAL PRESSURE GAUGE

Thomas H. Risk, Woodbury, N. J., assignor to Socony-Vacuum Oil Company, Incorporated, New York, N. Y., a corporation of New York Application November 27, 1934, Serial No. 754,949

3 Claims. (Cl. 73—110)

This invention relates to instruments of the class wherein differences in pressures are made use of to obtain indications or measurements. The apparatus of my invention is particularly adapted to be used in indicating apparatus of the type where the difference between pressures on opposite sides of an orifice through which fluid is flowing is made use of to indicate the rate of flow therethrough, or in which the difference between static and dynamic pressures of a flowing fluid is made use of to indicate the rate of flow thereof. I have found that it is particularly adapted, for instance, to the measurement of the rate of consumption of fuel in an aeroplane, or to the measurement of the speed of an aeroplane relative to the air, or for the measurement of the rate of flow of fluid in a pipe, or for any similar measurement.

Some of the difficulties encountered with prior art instruments of this type are delicacy, and inability to operate in any and all positions. Another difficulty has arisen from imposing the different pressures upon opposite sides of a single diaphragm, leakage of which would seriously impair the accuracy without becoming evident to the observer. Many such instruments have failed of accuracy because of excessive backlash and lost motion in connective linkages, or because of dependence upon delicate springs to transmit accurate readings. Other difficulties have arisen because of inherent construction which necessitated widely different degrees of scale accuracy at different points in the range. Many of these difficulties I have avoided by my novel construction.

Certain objects of this invention are to provide an instrument of this class having a minimum of operative parts, rugged, capable of sustained accuracy under severe conditions of service, having a minimum number of operative linkages which may permit back-lash and looseness, having a scale of reasonably comparable accuracy throughout its range, and such other objects and advantages as may be later set forth.

In order that my invention may be fully understood, attention is directed to the drawings showing its several parts, which drawings are attached to and hereby made a part of this specification. In the drawings, Figure 1 is an elevation of the instrument, partially in section, and Figure 2 is another elevation, 90 degrees removed from that of Figure 1. Figure 3 is a section of a modified form, corresponding to Figure 1, and Figure 4 an elevation of the modified form, corresponding to Figure 2.

Referring now to the drawings, and reading Figures 1 and 2 together, 5 denotes a cylindrical casing, composed of three parts, 6, 7, and 8, held together by a series of through bolts denoted by numerals 9. When assembled, with diaphragms, these parts constitute a pair of pressure chambers 10 and 11, each composed of one of the end sections and a diaphragm 12, and an intervening neutral chamber, open to the atmosphere. The two diaphragms 12 are operatively connected together in a neutral position by connecting link 13, having in its middle a stirrup 14. Vertically mounted in the neutral chamber is an operating lever 15, the middle portion of which is a leaf spring, which middle portion passes through the stirrup 14. Contact between this lever 15 and the sides of the stirrup 14 is so maintained that the lateral displacement of connecting link 13 results in a corresponding displacement of lever 15. The bottom end of lever 15 is fixed by cooperation of the two lever pivot bearing pins 16 and the lever spring tension adjusting screw 17. When a difference in pressure between chambers 10 and 11 exists, the position of the diaphragms 12 is changed, resulting in lateral motion of connecting link 13. This lateral motion of 13 transmitted through stirrup 14 to lever 15 results in a movement of the upper end of lever 15 through an arc described about the center of flexure of spring lever 15. A rack arm 18 is pin mounted on the upper end of lever arm 15, and held by means of spring 19 in contact with a pinion 20. Movement of the end of lever 15 thus effects rotative motion of the pinion 20 and pointer shaft 21, which is supported by needle bearings 22 mounted in suitable supports 23 which are fixed on the instrument body 5. A pointer 24 is affixed to the pointer shaft 21, and travels over a dial 25 supported by one of the supports 23. Pressure chambers 10 and 11 are supplied with pressure connections 26 and air bleed connections 27 which may be suitably piped in the customary manner. In order that proper zero adjustments may be made, an adjusting wedge 28 is provided, with a rider 29 for contact with lever 15. Adjusting wedge 28 is positioned by thumbscrew 30. The adjusting wedge 28 consists of a conical enlargement of the shaft of the thumbscrew 30, so that when the screw is turned the wedge 28 advances or recedes across the lever 15. The rider 29 may be formed most conveniently as a projection from lever 15, having an inclined plane face for contact with conical wedge 28. This zero adjustment provides a stop means for lever 15, and through it establishes the neutral position of the diaphragm mechanism.

An alternative, more rugged, and preferable form of construction is set forth in Figures 3 and 4, which should be read together. In this construction instead of the leaf spring lever 15 of Figures 1 and 2, I make use of a rigid lever, designated 15A, which swings about a center provided by needle bearing pin 31. A socket 32 is provided at the fixed end of lever 15A, and torsion spring bar 33 is firmly affixed therein. This torsion spring bar 33 is concentric with bearing pin 31 and extends without casing 5 through opening 34. An external support 35 affixed to casing 5 is provided, and clamp 36 with set screws 37 and 38 serves to fix the outboard end of bar 33. This form of construction has the merit of providing a fixed fulcrum for lever 15A, and a more rugged form of spring resistance. Additionally, the clamp 36 may be varied in position to afford a longer or shorter active length of torsion spring bar 33, thus securing an easy adjustment of spring strength and any desired pointer travel for various pressure differentials. This renders the adjustment of the instrument for use in various pressure ranges quite easy and convenient.

Some of the advantages flowing from this novel construction by means of which the objects of this invention are attained are pointed out in the following discussion.

Each diaphragm is in contact on one side with actuating fluid and on the other with the atmosphere, and a leak or break in a diaphragm is at once signalled by escape of fluid. There are a minimum of operative parts, and likewise a minimum of points where wear may impair accuracy. The operative parts employed are simple and rugged in construction. No dependence is placed upon the maintenance of strength of any delicate spring. Positive mechanical contact is depended upon for the transmission of indications.

With small differential pressures a small motion of the diaphragms occurs, and small motion of the spring lever arm is had. With large differences of pressure, large motions of the diaphragms would be had, except that they are limited by the increasing resistance of the spring lever arm 15. These two forces, working oppositely, tend to cause a similar rotation of the pointer shaft for similar increments of differential pressure at all points in the range of the scale, and proportions and spring strength may be so chosen or adjusted that scale divisions are practically constant throughout the operative range. This is the sole point where any dependence is made upon the continued strength of a spring. The spring here used is rugged, and in addition a quick and effective means of stiffening the spring is furnished by means of the spring lever tension screw 17, or by the torsion bar 33. When more rugged construction is desired, at the sacrifice of some accuracy at the extremities of the range, a mere lever may be substituted for the spring lever here described.

Further, the mechanism here shown is not of a type subject to derangement by vibrations. Similarly it has no part depending upon gravity for its action, and may be mounted in any position, or may be subjected to change of position without loss of accuracy.

I have found this device to be particularly adapted for use in an aeroplane in connection with a Venturi tube to show the rate of gasoline consumption. In this use, I may insert a Venturi nozzle or tube at some convenient point in the fuel flow line, and may connect one of the pressure chambers to the low pressure zone of said Venturi tube and the other to the high pressure zone. The pressure lead tubes should be brought from the Venturi tube to the differential pressure gauge in such a manner that they are at all times equidistant from a plane passed through the horizontal axes of the wings and fuselage. Before reading the gauge, the air in the pressure lead tubes and diaphragm chambers is bled out by opening the pet-cocks or other valves placed in the vent openings 16, to insure that the fuel fills both the pressure leads and the instrument chambers. With the flow meter tube, tubing, and gauge mounted as described, and without air or other gases in the pressure measuring system, no maneuver of the airplane except those involving slipping or skidding will cause an error due to differences in static head, and the instrument will read correctly in all other maneuvers. Since such conditions of flight which would cause errors are met with during only relatively short times, the essential accuracy of the instrument for the intended purpose is not impaired.

Various modifications may be made in this invention without departing from the spirit and scope thereof as set forth in the following claims.

I claim:

1. In an instrument for the measurement of differential pressures, a casing, and mounted therein two pressure responsive diaphragms dividing said casing into a low pressure chamber, a high pressure chamber, and therebetween a neutral chamber open to the atmosphere, each diaphragm being the sole pressure responsive member of the chamber of which it is a part, between said diaphragms and connected thereto a link member of fixed length adapted to be moved laterally by the differential movement of the diaphragms, a spring lever, means for fixing one end thereof, an operative connection between said spring lever and said diaphragm link member, whereby lateral movement of said link member causes proportional deflection of the free end of said spring lever, upon the free end of said spring lever a rack, a pinion and pinion shaft operated thereby, a pointer affixed to said pinion shaft, and a dial over which said pointer may travel.

2. In an instrument for the measurement of differential pressures, a casing, and mounted therein two pressure responsive diaphragms dividing said casing into a low pressure chamber, a high pressure chamber, and therebetween a neutral chamber open to the atmosphere, each diaphragm being the sole pressure responsive member of the chamber of which it is a part, between said diaphragms and connected thereto a link member of fixed length adapted to be moved laterally by the differential movement of the diaphragms, a spring lever, means for fixing one end thereof, an operative connection between said spring lever and said diaphragm link member, whereby lateral movement of said link member causes proportional deflection of the free end of said spring lever, a rack bar pivotally connected to the free end of said spring lever, a pinion and pinion shaft adapted to contact with said rack and to be rotated by movement thereof, a spring acting between the spring lever and the rack bar to force said rack bar into operative contact with said pinion, a pointer affixed to the pinion shaft, and a dial over which said pointer may travel.

3. In an instrument for the measurement of differential pressures, a casing, and mounted therein two pressure responsive diaphragms dividing said casing into a low pressure chamber, a high pressure chamber, and therebetween a neutral chamber open to the atmosphere, each diaphragm being the sole pressure responsive member of the chamber of which it is a part, between said diaphragms and connected thereto a link member of fixed length adapted to be moved laterally by the differential movement of the diaphragms, a lever, a fixed fulcrum point for said lever, a torsion spring bar of variable effective length affixed to said lever and acting to vary the resistance of said lever to motion, an operative connection between said lever and said diaphragm link member, whereby lateral movement of said link member causes proportional deflection of the free end of said lever, upon the free end of said lever a rack, a pinion and pinion shaft operated thereby, a pointer affixed to said pinion shaft, and a dial over which said pointer may travel.

THOMAS H. RISK.